3,203,866
PROCESS AND MEANS FOR REMOVING RADIO-
ACTIVE COMPONENTS FROM GASES AND
GASEOUS MIXTURES
Wilhelm Lehmer and Wolfgang Baldus, Munich, and
Walter Stich, Nurnberg, Germany, assignors to Gesell-
schaft fur Linde's Eismaschinen Aktiengesellschaft,
Munich, Germany, a German company
Filed Nov. 27, 1959, Ser. No. 855,653
Claims priority, application Germany, Dec. 2, 1958,
G 25,851, G 25,853, G 25,855
8 Claims. (Cl. 176—37)

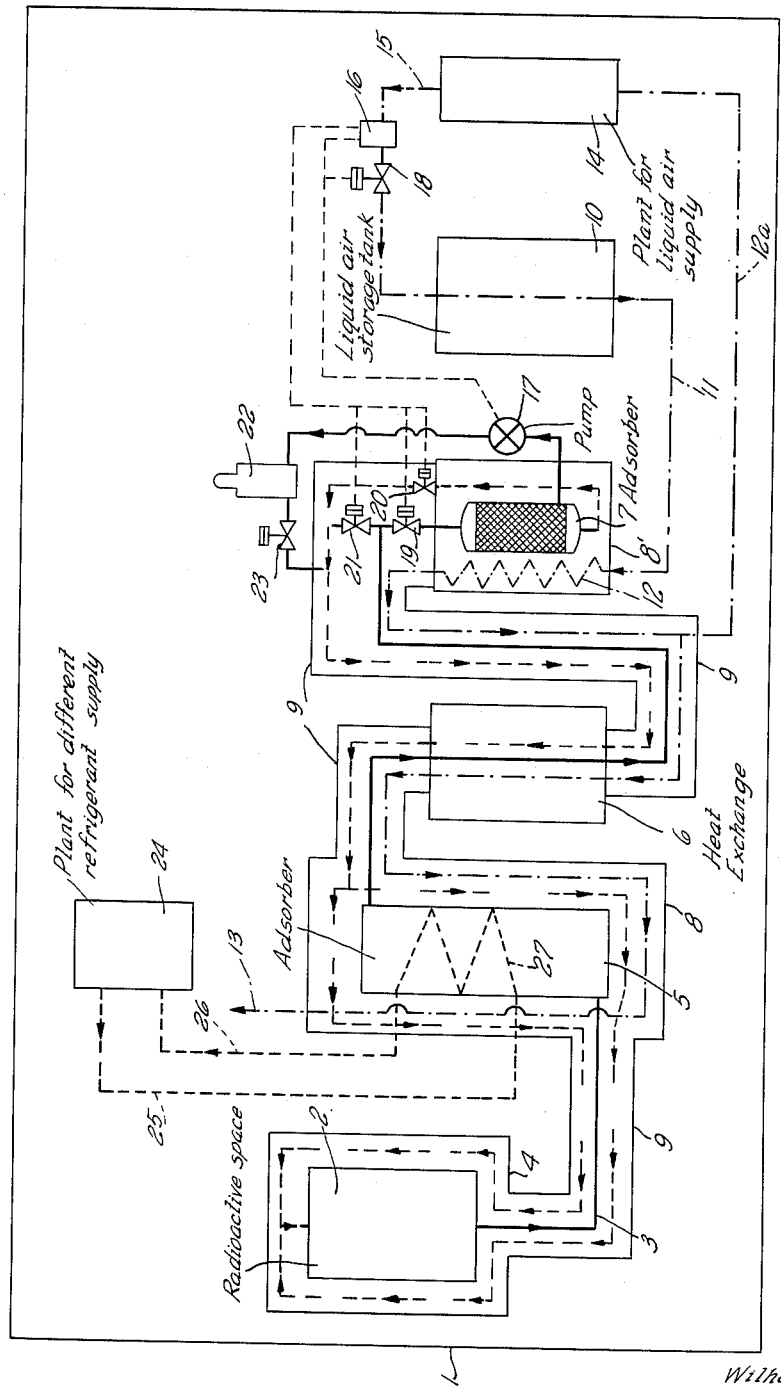

The invention relates to the purification of gases or gaseous mixtures contaminated by radioactive impurities, such as are found for instance in nuclear reactor units or installations connected therewith; the invention relates especially to the purification of cooling gases used in or in connection with nuclear reactor units and which constantly or periodically absorb radioactive impurities. It is considered, for instance, that the gases to be purified may be flowing in a circuit and after purification may be returned to the circuit for their original purpose, especially as cooling or protective gas within the reactor unit.

The execution of this type of purification in one or several adsorption stages is already practised, the adsorption of the active impurities being effected by conventional means.

It is also considered that the purification shall relate in the first place to gases and gaseous mixtures such as are already used, for instance, for cooling and protective purposes in gas reactor units and which consist especially of helium-neon mixtures or contain these as main component. Radioactive gaseous materials in reactor-cooling gases, which are to be removed consist mainly of radioactive xenon—and krypton—isotopes which tend to form in the reactor as fission products (or, products resulting from fission) and which must be kept at a low level of concentration.

The aim of the invention is to provide measures which will prevent the purification process for the said gases from itself becoming a further source of extension of the radioactive contamination.

Thus the invention relates to a process or means for the purification of gases or gaseous mixtures, for instance cooling or protective gases, which may be in circulation and which are contaminated with active impurities, especially in a nuclear reactor.

According to the invention, the said aim is achieved by causing the purified gas stream which has left the purifying plant to flow—with heat exchange if necessary—around at least a part of said purifying plant before being supplied or returned for further use, in particular as cooling and/or protective gas.

In accordance with a special feature of the invention, the purification plant is so constructed that the individual structural elements of said plant, in particular adsorbers, heat exchangers, connecting lines, countercurrent coolers and the like, are each—at least at points where there is any risk of breakage or leakage—encased in a special jacket designed and dimensioned for the admission and conduction of the purified gas stream serving as protective gas for the structural element in question. It is more especially intended that the cooling agent conduits for the structural elements of the gas purifying plant, in particular adsorbers, shall be screened from the pieces of apparatus and conduits carrying the active gas by conduits or chambers through which the already purified gas passes as protective gas especially for the gas entering to be purified.

The underlying idea of these measures is especially to conduct the coolant which is required for the execution of the purification process, particularly absorption process or adsorption process, for instance Freon, cooled gaseous or liquid air, through the purifying plant in such a way that even if leakage occurs it can never become contaminated by active gas, but at most by already purified gas. This measure is of the greatest importance because it is precisely through the conduits for the coolant that new connections are created, through the purifying plant, between the reactor unit or that part of the reactor unit which is to be supplied with the cooling gas to be purified and further parts of the environment. The general principle of the purification process according to the invention is thus as follows: that the active, not yet purified streams and partial streams of the gas or gaseous mixture contaminated by radioactivity are conducted as far as possible in the interior of the purification plant; that the auxiliary streams, especially of the coolant or coolants required for purification, are conducted as far as possible outside the whole purification plant and the purified gas is so conducted that it largely envelopes the gas to be purified or at least screens it from the streams of coolant.

The single figure of drawing is a diagrammatic sketch of the purification plant for execution of the process according to the invention, as an example.

1 represents the boundry of a nuclear reactor unit, within which is situated an enclosed space 2 through which flows a stream of cooling gas. The cooling gas stream is conducted in a circuit. At least a part of it emerges from the enclosed space 2 in the form of a gas stream 3 to be purified, having been contaminated by radioactive substances present in the enclosed space 2, and then after passing through the purifying plant re-enters the enclosed space 2 as a purified gas stream 4. One contaminated gas stream 3, i.e. gas stream to be purified, is represented by a continuous line and one purified gas stream 4 is represented by a broken line.

In the example given the cooling gas stream consists of a mixture of helium and neon, which may also contain a greater or lesser admixture of still heavier inert gases, especially krypton and/or xenon. It is also within the scope of the invention, however, that other gases or gaseous mixtures may be used. The example given also provides for the purification of the gas stream 3 in two stages, especially two adsorption stages, for each of which a special cold circuit is provided, with two different coolants. It is, however, also within the scope of the invention that a purification process in one stage or in more than two stages be provided, in which at least one of said purification stages can operate by some other means than adsorption, for instance by adsorption, especially by means of a washing process using a gaseous and/or liquid medium.

In the diagrammatic sketch in a first purification stage an adsorber 5 serves to adsorb certain, especially non-radioactive impurities, operating at a temperature determined by a coolant, such as Freon. According to the invention, the whole adsorber 5—in certain cases including the return line 4 to the enclosed space 2—is encased in a special jacket 8, for instance of V2A steel, and a connecting conduit 9. In this way the cooling coil 27 surrounding the adsorber 5 is also enveloped in a protective gas atmosphere formed by the purified gas stream 4 flowing through the interior of the jacket 8.

Through the preliminary purification stage 5 the gas to be purified enters first into a heat exchanger 6 and from there into an adsorber 7. Said adsorber 7 is encased in a protective jacket 8' through which the purified gas, flowing round said adsorber itself, streams back through the heat exchanger 6 and around the preliminary purification stage 5 into the enclosed space 2, everywhere in countercurrent to the gas stream to be purified. To cool the incoming flow of gas to be purified as well as the adsorber 7 itself, a current 11 of liquid air is provided, which comes from the storage tank 10 and is represented by a dash-and-dot line. The liquid air first of all flows through a cooling coil 12 to cool the adsorber 7 and then, also in countercurrent to the gas to be cooled and purified, passes out of the system at 13. Or is returned, via conduit 12a, to a liquid air unit 14 which is provided to supply the tank 10. It is also within the scope of the invention that in certain cases a protective atmosphere or protective channel of purified gas from the gas stream 4 may be arranged between the conduits for the streams 3 and 13 flowing in countercurrent inside the heat exchanger. This would, however, impair the heat exchange and is therefore not provided for in the example given. The actual purification of the gas stream 3 from active impurities is effected in an adsorber 7, which contains active charcoal and according to the invention is also encased in a protective jacket 8' of V2A steel.

A further aim of the invention is to prevent any risk of an adsorber being destroyed by a sudden rise of pressure therein for instance due to failure of the cooling system, which could result in an escape of the radioactive substances retained in the adsorber, with extremely harmful consequences to the environment.

The liquid air is initially produced in a liquid air unit 14 from which it is fed to the storage tank 10 through the conduit 15. Said conduit 15 is equipped with a measuring and control device 16, according to the invention, which depending on the gas pressure and/or temperature of the liquid air current can actuate a pump 17. Said pump 17 then comes into operation and empties the adsorber 7 down to a fixed maximum pressure of the gas carrying the radioactive impurities, especially the helium-neon mixture, as soon as damage or failure occurs in the liquid air unit 14 so that the measuring and control device 16 responds.

The pump 17 is automatically stopped by the measuring and regulating device 16 as soon as the remaining pressure in the adsorber 7 has dropped to a definite level only just permissible. By this means it is ensured that the gas remaining in the adsorber is only present in such quantity that the pressure in the adsorber 7, even when the latter is warm, cannot rise to an inadmissible level. The gas is pumped off at a temperature low enough for no excess pressure to occur.

Simultaneously, the valves 18, 19 and 20 which are connected to the measuring and control device 16 are closed with the result that on the one hand the liquid air tank 10 is closed off and on the other hand the adsorber 7 is cut off from its inlet and outlet. To assure the further outflow of air from the tank 10, suitable means are provided, not shown in the diagram, for instance a heating device which can be automatically switched on. A valve 21 is provided, with the help of which the conduits 3 and 4 to and from the adsorber 7 can if necessary be connected in short circuit.

An alarm signal is also provided for, connected to the aforementioned safety device 16, to warn the operating personnel of the break-down. Also connected to the safety device are means by which it is possible in the event of an accident to switch the purification process over automatically to another reserve adsorber or if necessary to stop the operation of the whole reactor unit.

According to a special feature of the invention it is also provided that the adsorber 7 or, if there are several separate purification units operating together, each adsorber be connected to a cooling liquid storage vessel 10, especially a liquid air storage vessel, in which the liquid is maintained at a constant level by the installation 14 producing the cooling liquid, especially the liquid air unit, and said storage unit is of such dimensions and so connected to a control and if necessary also safety device that in the event of failure of the liquid air production for cooling, especially of the liquid-producing means, there is on hand a supply of cooling liquid, especially liquid air, sufficient for several hours, in particular for about two hours. When such a buffer volume of cooling liquid, especially liquid air, is available, the safety device comes into action either immediately or after a fixed time in such a way that first of all the alarm signal is given and then said pumping off operation is carried through to the end at a sufficiently low temperature.

The contents of the adsorber 7 are conducted by any of the conventional means into a storage container 22 which is connected through a valve 23, operated either by hand or also by the control device 16, to the return conduit 4 for the gas leading to the enclosed space 2, so that the gas pumped off can be returned to the circuit again; if the pumping off operation is not carried out too forcibly or too far, said gas pumped off is not radioactive, as was revealed during the experiments on which the invention is based.

The adsorber 5 for preliminary purification may be cooled additionally or solely by Freon, which is supplied from and removed to a refrigerating machine 24 through the dotted lines 25 and 26, flowing through a spiral tube 27 conveniently surrounding the adsorber 5.

Hence according to the invention the following is achieved in this system:

First, at low temperature the maintenance of which is guaranteed for a sufficient length of time by the contents of the tank 10, such a quantity of helium-neon mixture is pumped out so that the pressure in the adsorber cannot rise to an inadmissible level in the event of said adsorber's later becoming warm; secondly, only so much helium-neon mixture is pumped off, however, that the pumped off gas does not yet carry with it any of the radioactive impurities retained on the adsorber.

The safety measures according to the invention also take into account the further problem of avoiding an extension of the radioactive pollution to the coolant with a resulting spread of radioactivity.

This problem is solved in that the refrigerant, especially air low cooled or liquefied in the conventional manner, or its steam, transfer its cold primarily to a protective gas which consists preferably at least partly of the purified gas stream, and transfers its cold secondarily to the gas to be purified or to the elements of the purifying plant itself.

As a result of this, the purification stage serving to remove the radioactive components, especially the adsorption device, does not come into direct contact with the actual refrigerant.

At least a part of the cooling and/or protective gas, especially the helium-neon mixture, to be freed from radioactive components may conveniently, after leaving the space to be cooled and/or protected, and in order to be subjected to at least two successive purifying processes of which preferably at least one is an adsorption process, is cooled down to two different temperature levels corresponding to said two purifying processes and after complete purification is returned again to the radioactively contaminated space to be cooled and/or protected, flowing partly in countercurrent to itself or to the not yet or not completely purified gas.

According to a different feature of the invention, a special refrigerant, for instance Freon, flowing through a circuit, is provided for cooling at least one preliminary purification stage.

According to another feature of the invention it is provided that this refrigerant shall at the same time, connected in parallel or in succession, serve to pre-cool the air to be liquefied. This idea may be equally well expressed by saying that the pre-cooling agent customarily used for pre-cooling the air to be liquefied is simultaneously designed to circulate and effect the cooling of the preliminary purification stage or at least one purification stage, especially adsorption stage. Since this cooling is effected by means of a circuit, it is possible to renew the refrigerant from time to time in the event of its becoming, in the long run, contaminated with radioactivity.

The question as to whether the preliminary stage or stages is or are to be cooled by one and the same refrigerant, especially the liquid or cooled air, or whether another coolant, especially Freon, is to be used for this, depends on the through-put of the gas to be purified in each case. It is within the scope of the invention that purification may be effected in different parts of a nuclear reactor, in different purification circuits with different throughputs and at different pressures, and that in that case a special refrigerant is used for preliminary purification especially for the higher throughputs, whereas for low throughputs a part of the liquid air supply can be used for preliminary purification.

With respect to the operation of the liquid air production unit, a further feature of the invention provides that the running times, especially thawing times, for the liquid air production are made to correspond with the working times of the adsorbers so that the adsorbers have to be changed and replaced by new adsorbers at the same times as the liquid air production has to be stopped in order to allow the unit to thaw. It is expedient to arrange that these times in their turn coincide with those in which the nuclear reactor, for reasons connected with the principle on which it works, has to cease operation, for instance to allow of the execution of necessary repairs.

*Example*

From a stream of cooling gas consisting of a mixture of helium and neon, which is constantly being pumped through the antechamber 2 of a nuclear reactor, a part amounting to approximately 0.5–5% is diverted and subjected to the following purification:

The gas under a pressure of 7–10 atm. is first of all heated to around 475° C. and passed over a cupric oxide contact, by which means the $H_2$ and CO components contained in the gas are oxidized to $H_2O$ and $CO_2$. After cooling in several stages, the gas, partly in counterflow with the returning purified gas and/or the escaping cool air, and partly giving up on the way components condensing at higher temperatures, is passed through the first adsorber 5 and then further cooled, in the heat exchanger 6, once again partly in counterflow with the returning purified gas, partly with cooled air coming from a liquid air production unit 14, partly with a diverted portion of the stream of purified gas flowing back, which has already been greatly pre-cooled by the liquid air (not shown in the diagrammatic sketch). After this the gas to be purified is passed through the last adsorber 7 which is itself at the same time being cooled by a part of the purified gas flowing out of it and cooled by liquid air in the cooling coil 12.

The adsorber 5 in the preliminary stage is cooled, in the preceding example, with Freon which is cooled in circulation by means of a conventional refrigerating machine 24 and is used simultaneously to pre-cool the air to be liquefied in the liquid air unit 14. The cooling in the preliminary stage 5 takes place at around −70° C., being the temperature to which the Freon is cooled. The separation of the radioactive substances in the low cooled adsorber 7 takes place at about 90° K.

We claim:

1. Process of purification of gases, which have been contaminated wtih radioactive substances, while being used as cooling or protecting gases for spaces contaminated with radioactive substances, by means of a purifying plant including at least one sorption device, which comprises passing the contaminated gas through said purifying plant thereby freeing the gas from radioactive substances, forming a buffer of protective gas about at least a part of said purifying plant by leading said gas freed from radioactive substances through an encasement about at least said part of said purifying plant containing radioactively contaminated gas, and then returning said gas freed from radioactive substances to said radioactively contaminated space for further use as cooling or protecting gas for said space contaminated with radioactive substances.

2. Process according to claim 1, in which said purifying plant includes at least one adsorber filled with conventional adsorption material and in which said gases contaminated with radioactive substances and flowing through said purifying plant are cooled by means of a separate protective gaseous heat transfer agent which is cooled by a separate cooling agent.

3. Process according to claim 2, in which said gases which have been passed through said purifying plant and there freed from radioactive substance and flowing through said encasement of at least part of said purifying plant in the opposite direction to be returned to said space contaminated with radioactive substances simultaneously serve as heat transfer agent between said part of said purifying plant containing said contaminated gases to be purified and said separate cooling agent.

4. Process of purification of gases which have been contaminated with radioactive substances, while being used as cooling or protecting gases for spaces contaminated with radioactive and other substances by means of a purifying plant including at least one sorption device, in which said gas to be freed from radioactive and other components is successively cooled down to two different temperature levels at which said gas is subjected to at least two successive purification stages of which at least one is an adsorption stage and serves for freeing said gas from radioactive components and after complete purification forms a buffer of protective gas free of radioactive components about at least a part of said purifying plant by passing said gas freed from radioactive substances through an encasement of at least said part of said purifying plant containinig radioactively contaminated gas back to said space contaminated with radioactive substances for further use as cooling or protecting gas.

5. Process of purification of gases which have been contaminated with radioactive substances, while being used as cooling or protecting gases for spaces contaminated with radioactive and other substances by means of a purifying plant including at least one sorption device, in which said gas to be freed from radioactive and other components is successively cooled down firstly by the use of Freon as cooling agent for at least one preliminary purification stage and further by the use of a cooling agent of lower temperature such as liquid air for the final purification stage, at least one of which at least two purification stages being an adsorption stage and serving for freeing said gas from radioactive components, and after complete purification forms a buffer of protective gas free of radioactive components about at least a part of said purifying plant by passing said gas freed from radioactive substances through an encasement of at least said part of said purifying plant to said space contaminated with radioactive substances for further use as cooling or protecting gas.

6. A purifying plant for gases which have been contaminated with radioactive substances while being used as cooling or protecting gases for a space contaminated with radioactive substances and for returning said gases after their purification to said space, which plant comprises as individual structural elements at least one preliminary sorption device which is provided with indirect cooling means connected to a plant for supply of a cooling agent such as Freon returning to said plant; a heat exchanger for further cooling down the gases escaping from said preliminary purifying stage by means of a cooling agent such as liquid air to a lower temperature; an adsorber for freeing said cooled gas from radioactive components, said adsorber being provided with indirect cooling means connected to a plant for supply of said cooling agent such as liquid air returning to said plant; at least each part of said structural elements at which there is any risk of leakage of radioactively contaminated gases being encased in a special jacket designed and dimensioned for the admission and conduction of the gas freed from radioactive substances returning to said space contaminated with radioactive substances and serving as a buffer of protective gas in said encasement of said structural elements containing radioactive substances.

7. A purifying plant for gases which have been contaminated with radioactive substances while being used as cooling or protecting gases for a space contaminated with radioactive substances and for returning said gases after their purification to said space, which plant comprises as individual structural elements at least one adsorber for freeing said gas to be purified firstly from radioactive substances, which adsorber is provided with indirect cooling means connected to a plant for supply of a cooling agent such as Freon returning to said plant, a heat exchanger the inlet of a first channel of which is connected to said adsorber outlet and the outlet of said first channel of which is connected to a further sorption device for freeing the gas from non-radioactive impurities, the inlet and outlet of a second channel of which heat exchanger is connected to a second plant for supply of another cooling agent of lower temperature such as liquid air returning to said second plant, and at least each structural element at which there is any risk of leakage of radioactively contaminated gases being encased in a special jacket designed and dimensioned for the admission and conduction of an already purified gas stream escaping from said last sorption device and returning to said space contaminated with radioactive substances, said purified gas stream serving as a buffer of protective gas for said structural elements containing radioactive substances.

8. A purifying plant as defined in claim 6 in which said purifying plant includes at least one adsorber for freeing said gases from radioactive substances provided with indirect cooling means connected to a source of supply of a cooling agent such as liquid air returning to said source, which comprises a safety system consisting of a measuring and control device for the operating pressure and temperature conditions, said device being in structural conjunction with valves in the conduits to and from said adsorber and with a pump the inlet of which is connected to said adsorber and the outlet of which is connected to said encasement by way of a storage tank, and a pressure valve for shutting off said valves to and from the adsorber and to actuate said pump for pumping off the still purified gaseous medium from said adsorber and to open a valve connecting said conduits to and from said adsorber in short circuit in a case of failure of liquid air supply from said source.

References Cited by the Examiner
UNITED STATES PATENTS

| | | | |
|---|---|---|---|
| 1,800,353 | 4/31 | Messer | 62—29 |
| 1,863,579 | 6/32 | Morse | 62—94 |
| 1,872,783 | 8/32 | Miller | 62—94 |
| 1,925,812 | 9/33 | Miller | 62—94 |
| 2,348,478 | 5/44 | Jones | 62—55 |
| 2,472,729 | 6/49 | Sidell | 62—503 |
| 2,571,014 | 10/51 | Colburn et al. | |
| 2,642,153 | 6/53 | Parks | 55—28 |
| 2,712,730 | 7/55 | Spangler | 62—9 |
| 2,837,477 | 6/58 | Fermi | 204—193.2 |
| 2,918,801 | 12/59 | First et al. | 62—18 XR |
| 2,921,891 | 1/60 | Colichman | 204—154.2 |
| 2,926,502 | 3/60 | Munters | 62—94 |
| 2,939,293 | 6/60 | Green | 62—21 |
| 2,975,118 | 3/61 | Tognoni | 204—193.2 |

OTHER REFERENCES

Staber, G. I.: Closed-Cycle Boiling-Water Reactor, in Power, September 1955, page 74–81.

NORMAN YUDKOFF, *Primary Examiner.*

GEORGE D. MITCHELL, ROBERT A. O'LEARY, EDWARD J. MICHAEL, *Examiners.*